US012672941B2

(12) United States Patent
Grobecker-Karl

(10) Patent No.: US 12,672,941 B2
(45) Date of Patent: Jul. 7, 2026

(54) DENTAL IMPLANT MADE OF A METAL OR A METAL ALLOY

(71) Applicant: Alfa-Gate Mazen Ltd., Kfar Qara (IL)

(72) Inventor: Tanja Grobecker-Karl, Homburg (DE)

(73) Assignee: Alfa-Gate Mazen Ltd., Kfar Qara (IL)

( * ) Notice: Subject to any disclaimer, the term of this patent is extended or adjusted under 35 U.S.C. 154(b) by 405 days.

(21) Appl. No.: 17/999,547

(22) PCT Filed: May 18, 2021

(86) PCT No.: PCT/EP2021/063052
§ 371 (c)(1),
(2) Date: Nov. 21, 2022

(87) PCT Pub. No.: WO2021/233859
PCT Pub. Date: Nov. 25, 2021

(65) Prior Publication Data
US 2023/0200951 A1    Jun. 29, 2023

(30) Foreign Application Priority Data

May 19, 2020    (EP) ..................................... 20175542

(51) Int. Cl.
*A61C 8/00*    (2006.01)
(52) U.S. Cl.
CPC .......... *A61C 8/0012* (2013.01); *A61C 8/0024* (2013.01)
(58) Field of Classification Search
CPC ... A61C 8/0012; A61C 8/0024; A61C 8/0068; A61C 8/0037; A61C 13/0004

USPC ....................................... 433/174–176, 201.1
See application file for complete search history.

(56) References Cited

U.S. PATENT DOCUMENTS

| | | |
|---|---|---|
| 2008/0014556 A1 | 1/2008 | Neumeyer |
| 2008/0187886 A1* | 8/2008 | Robb ................... A61C 8/0022 |
| | | 433/174 |
| 2012/0237898 A1 | 9/2012 | Palti |
| 2015/0017605 A1 | 1/2015 | Su |
| 2017/0215995 A1* | 8/2017 | Rompen ................ A61C 8/006 |
| 2017/0354485 A1 | 12/2017 | Chu |

FOREIGN PATENT DOCUMENTS

| | | | |
|---|---|---|---|
| CN | 106725932 A | 5/2017 | |
| EP | 2401982 A2 | 1/2012 | |
| WO | WO-2012059908 A1 * | 5/2012 | ........... A61C 8/0022 |

* cited by examiner

*Primary Examiner* — Eric J Rosen
*Assistant Examiner* — Mirayda A Aponte
(74) *Attorney, Agent, or Firm* — Prismatic Law Group, PLLC; Ronald J. Kamis

(57)          ABSTRACT

Dental implant (1) for anchoring of a dental prosthesis, wherein the dental implant (1) has a core (10) and an external thread (3) surrounding the core (10), wherein the dental implant (1) has an apical end (11) and a cervical end (12) to be screwed by means of the external thread (3) with the apical end (11) first into a recess formed in a jaw bone and to anchor the dental prosthesis at the cervical end (12), wherein the dental implant (1) consists of material which contains or consists of a metal or a metal alloy, wherein the core (10) has a bulge (A) in the middle area (4) in any cross-section passing through the entire length of the longitudinal axis (L) of the dental implant.

9 Claims, 2 Drawing Sheets

DENTAL IMPLANT MADE OF A METAL OR A METAL ALLOY

Figure 1:
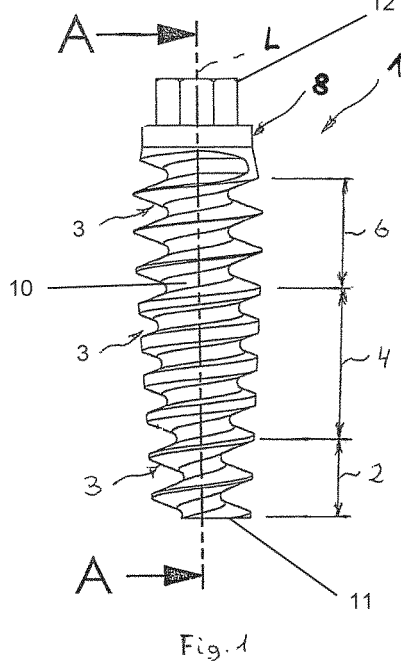

The invention relates to a dental implant made of a metal or a metal alloy for anchoring of a dental prosthesis, wherein the dental implant comprises a core and an external thread surrounding the core.

Such a dental implant is known from US 2012/0237898 A1. The known dental implant discloses an elongate body portion at an apical portion of the implant and a neck portion at a coronal portion of the implant. A first helical thread profile is around a first portion of the elongate body at the apical portion. A second helical thread profile that is different from the first helical thread profile is around a second portion of the elongate body that is between the first portion and the neck portion. The implant further comprises a third helical thread profile that is around the neck portion and that is different from the first and second helical thread profiles. The first helical thread profile may be a V-shaped thread profile. The second helical thread profile may be shaped to have a flat surface toward the apical side, wherein a normal to the flat surface is generally parallel to the longitudinal axis of the implant. The second helical thread may have a progressive thread geometry along the longitudinal axis.

From EP 2 401 982 A2, a dental implant having a body section to be inserted in a bone structure with a mounting section integrally joined thereto is known, wherein the body section comprises a thin and short core, screw blades formed along an outer peripheral surface of the core in the shape of a wide and deep screw, and a connecting section. An outer circumference of a proximal section and of an upper section of the body section is smaller than a maximum diameter of the body section and the mounting section is smaller than the maximum diameter of the body section.

US 2017/0354485 A1 discloses a dental implant having a body and a surface having a thread. The body has an upper portion, a middle portion, and a lower portion.

The upper portion of the body includes a generally cylindrical portion. The lower portion of the body includes a generally inwardly tapered area. The middle portion of the body includes an outwardly extending bulge. A maximum outer diameter of the bulge is greater than a maximum outer diameter of the upper portion and a maximum outer diameter of the lower portion. The surface having a thread is located on the body at least within the upper portion of the body, the bulge, and the lower portion of the body. The shape of the outside of the thread corresponds to the shape of the surface.

US 2015/0017605 A1 discloses a dental implant having a shank and a threaded section spirally disposed on the shank. The shank includes a first section extending from a first end toward a second end of the shank and a second section connecting the first section to the end. A shank diameter of a connecting section where the first and second sections are connected is smaller than that of the second section.

CN 106725932 A discloses an implant system with a straight abutment based on a titanium-zirconium alloy. The implant system comprises an implant insert section consisting of a first frustum, a quincunx column and a second frustum. The connection section of the dental crown is connected to the large-diameter end of the first frustum. The small-diameter end of the first frustum is connected to one end of the quincunx column. The implant has a dual-thread structure combining a main thread and a secondary thread.

From US 2017/0215995 A1, a dental implant formed of an anchoring body defined between an apical end and a cervical end is known, wherein the anchoring body is a body having a first predetermined length and having at least one thread on an outer surface and along the entire first predetermined length. In this regard, the anchoring body comprises on at least a coronary section of the implant a section of the at least one thread having a nominal diameter, wherein the nominal diameter is greater than an outer diameter of the anchoring body on the coronary section. The anchoring body may have a conical-cylindrical shape or conical shape with converging conicity toward the apical end.

US 2008/0014556 A1 discloses a dental implant having an implant corpus which forms in its longitudinal axis consecutively at least one enossal area that can be anchored in the bone, an emergence area for emergence through a soft tissue and a coronal area with retention pins, wherein the enossal area forms at least three sub-areas with different threads which sub-areas are also consecutively adjoining in the direction of the longitudinal axis. The core of the implant corpus has in both an apical sub-area and in a coronal sub-area a cross-section which increases in at least one cross-sectional axis to the coronal area, and has an essentially constant cross-section in an alveolar sub-area in between.

From WO 2012/059908 A1 a conical implant for insertion into a bore hole in a bone tissue is known, wherein the implant has a cancellous section and a cortical section. When the implant is screwed into the bore hole, compression of the *cortical* bone tissue is effected by the cortical section.

It is an object of the present invention to provide an alternative dental implant and to disclose a method for its manufacture.

The object is achieved by the features of claims 1 and 8. Appropriate embodiments result from the features of claims 2 to 7.

According to the invention, a dental implant for anchoring of a dental prosthesis is provided, wherein the dental implant comprises a core and an external thread surrounding the core, wherein the dental implant has an apical end and a cervical end to be screwed by means of the external thread with the apical end first into a recess formed in a jaw bone and to anchor the dental prosthesis at the cervical end. The dental implant consists of a material which comprises a metal or a metal alloy or consists of a metal or a metal alloy. In the order from the apical end to the cervical end, the dental implant comprises a tip area in which the external thread is sharp-edged,
a middle area adjoining the tip area, in which the external thread is trapezoid-like and
a coronal area adjoining the middle area, in which the external thread is sharp-edged.

A longitudinal axis extends through the tip area, the middle area and the coronal area, wherein the core has a bulge in the middle area in any cross-section passing through the entire length of the longitudinal axis, while the external thread has a nominal diameter which is constant in the entire middle area or increases in the entire middle area in a direction from the apical end to the cervical end.

Nominal diameter here means the largest diameter of the external thread at any position of the external thread, i.e. the external diameter of the external thread. In that the nominal diameter is constant in the entire middle area or increases in the direction from the apical end to the cervical end, the external thread is not bulged in the middle area in any cross-section passing through the entire length of the longitudinal axis. Thus, the bulge does not comprise the external thread. This means that the thread depth of the external thread in an area of the bulge is smaller than in the non-bulged tip area or coronal area. The greater the bulge of the core, the smaller the thread depth.

The term "bulge" in this context has its common meaning, namely that of a protrusion or outward curvature. The bulge is shown, for example, in that in a cross-section passing through the entire length of the longitudinal axis, a line connecting the base areas of the external thread is curved outward. The base areas are those areas that connect in each case two adjacent flanks of the external thread on the inside of the thread. The base areas are located on the surface of the core. Since the nominal diameter is constant in the entire middle area or increases in the entire middle area in the direction from the apical end to the cervical end, the thread depth initially decreases due to the bulge of the core in the direction from the apical end to the cervical end within the middle area and then increases again after a minimal thread depth is reached within the middle area. Thereby, the thread depth decreases until the smallest difference between the nominal diameter and the diameter of the core is reached and increases again as soon as this difference increases again. If the nominal diameter is constant in the entire middle area, the smallest difference between the nominal diameter and the diameter of the core is reached where the diameter of the core is maximal. If the nominal diameter increases in the entire middle area in the direction from the apical end to the cervical end, the smallest difference between the nominal diameter and the diameter of the core is reached before the maximal diameter of the core is reached in the direction from the apical end toward the cervical end. The maximal diameter of the core is the area of the most developed bulge. The maximal diameter of the core and the minimal thread depth may each be reached at one point on each side of the longitudinal axis in a cross-section passing through the entire length of the longitudinal axis, or may extend over a range.

Due to the bulge in the middle area, the implant according to the invention differs substantially from the implant according to US 2008/0014556, in which the core of the implant corpus has an essentially constant cross-section in the alveolar subarea located between the apical sub-area and the coronal sub-area.

A cross-section passing through the entire length of the longitudinal axis is a cross-section that depicts the longitudinal axis as a straight line and does not run transverse to the longitudinal axis. A cross-section running transverse to the longitudinal axis would depict the longitudinal axis as a point.

A sharp-edged external thread is understood to be an external thread whose thread flank forms an acute angle in cross-section. For the purposes of the invention, a trapezoid-like external thread can either be a trapezoidal thread in which the profile of the thread turns has the shape of an isosceles or a non-isosceles trapezium, or be a thread in which the thread flank is at least flat and is in any cross-section passing through the entire length of the longitudinal axis parallel to the longitudinal axis.

The inventor of the present patent application has recognized that a frustoconical design of a dental implant known in the prior art is not necessary and is even disadvantageous. Investigations of the torque required in each case for inserting a dental implant into a recess of the jaw bone have shown that a frustoconical dental implant requires a relatively high torque. When inserting such a dental implant, the maximal torque is achieved when the threaded parts of the coronal area, which have the largest outer diameter, are screwed into the cortical bone of the jaw bone. In this process, the bone is strongly compressed at this point, thereby reducing its blood supply. This can lead to a dying off and thus degradation of the bone at this site. Such a compression of the cortical bone tissue by the cortical section of the implant is described, for example, in WO 2012/059908 for the implant known therefrom.

In contrast, the dental implant according to the invention leads to less mechanical stress on the cortical bone of the jaw bone when the implant is inserted, because there is less compression of the bone in the area of the cortical bone. At the same time, however, a high strength of the implant in the jaw bone is achieved due to the bulge in the middle area and the resulting compression in a deeper area of the jaw bone. Due to the bulging of the core, without the outer contour of the implant also being bulged, relatively little bone has to be removed in the cortical area of the jaw bone in order to be able to insert the dental implant. Compared to conventional implants, the maximal diameter of the core is thus shifted to the area of the easily compressible cancellous bone of the jaw bone. The trapezoid-like external thread in the middle area provides additional compression and does not cut into the bone. The external thread is therefore a compressing thread and not a cutting thread. In this way, there is also no injury to the inner alveolar *compacta* in the case of immediate implantation in an extraction alveole formed after removal of a tooth. In such an immediate implantation, the middle area is advantageously positioned in such a way that the inner alveolar *compacta*, the cortical lining of the bony tooth compartment, is optimally used for fixation the implant. The dental implant according to the invention thus enables ideal integration of the implant both in extraction alveoles and in the healed jaw bone. Nevertheless, the dental implant according to the invention also achieves a high primary stability directly after insertion without overloading the cortical bone of the jaw bone. This applies even if it should be necessary to unscrew the dental implant slightly from the jaw bone again for ideal positioning of the implant. This is not the case with the frustoconical dental implants known in the prior art.

Figure 4:
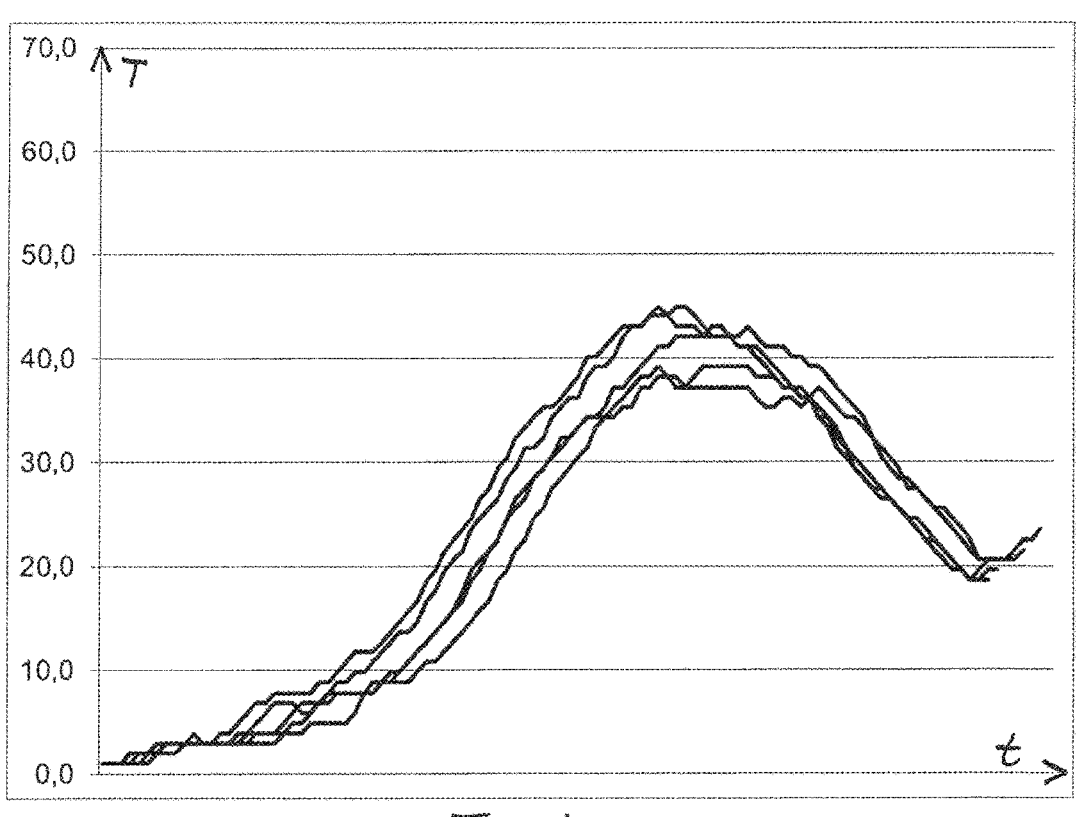

A torque characteristic during insertion of the implant into the jaw bone, which can be seen for example in FIG. 4, is particularly advantageous for the dental implant according to the invention and simplifies good implant positioning in relation to the insertion depth, since the maximal torque is achieved when the middle part of the dental implant passes the cortical plate and not only when the coronal area of the dental implant engages the cortical bone.

The tip area of the dental implant usually comprises 2 to 3 thread turns. The middle area with the trapezoid-like and thus blunter external thread compared to the external thread of the tip area, usually has 4 to 5 thread turns. The adjoining coronal area may comprise 2 to 3 thread turns. The mentioned areas usually form a one-piece implant body.

In one embodiment of the dental implant according to the invention, the nominal diameter of the external thread is equal or increasing in the direction from the apical end to the cervical end in an entire area comprising the tip area, the middle area and the coronal area.

The metal may be titanium. The metal alloy may comprise titanium and may be, for example, a titanium-zirconium alloy.

The bulge of the core in the middle area means that the core, viewed from a direction of the longitudinal central axis or longitudinal axis, has an outward bulge, i.e. an outward curvature, so that the core in the middle area is more massive compared to the tip area and the coronal area. In this context, it is possible that straight lines laid alongside the outer shape of the dental implant, i.e. alongside the outer side of the external thread, on opposite sides converge towards the apical end or run parallel to each other.

Due to the bulged design of the core in the middle part, it is possible for the core to be tapered in the tip area and coronal area compared with the middle area. This means that the tip area and the coronal area can be less massive than the middle area.

In a further embodiment, an end area adjoins the coronal area, into which end area an abutment or a prosthetic suprastructure can be screwed via an internal or external connection with an internal thread.

Furthermore, it is possible that the thread depth in the tip area and in the coronal area is greater than in the middle area.

In a further embodiment of the dental implant according to the invention, the external thread and the core are formed in one piece. For this purpose, the dental implant can be manufactured as a turned part by chip removing processing. In this case, it is possible in a particularly simple manner to form the unequal external threads of the tip area, the middle area and the coronal area, which merge into one another, in particular in a single operation. In addition, also the bulge in the middle area can be produced relatively easily.

The invention further relates to a chip removing method of manufacturing of the dental implant according to the invention by turning a turned part from a material which comprises a metal or a metal alloy, wherein the external thread is cut into the turned part by means of a cutting tool, wherein the bulge in the middle area is created by changing of the distance of a cutting area of the cutting tool from a rotation axis coinciding with the longitudinal axis. Simultaneously with the bulge, the trapezoid-like external thread can thus be created in a single operation. It is also possible to create the merging unequal external threads of the tip area, the middle area and the coronal area together with the bulge in a single operation.

Figure 2:
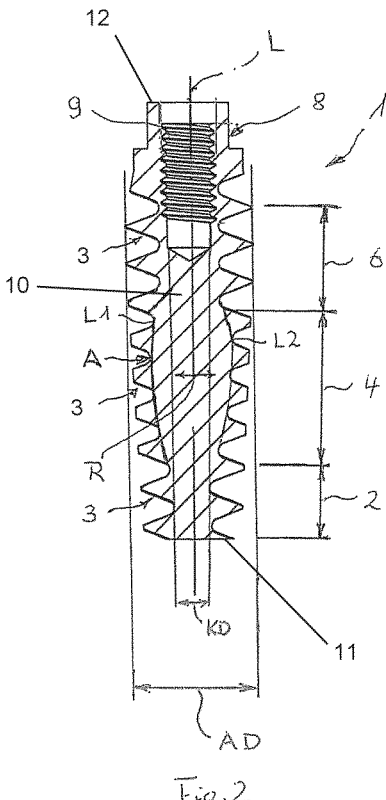
Figure 3:
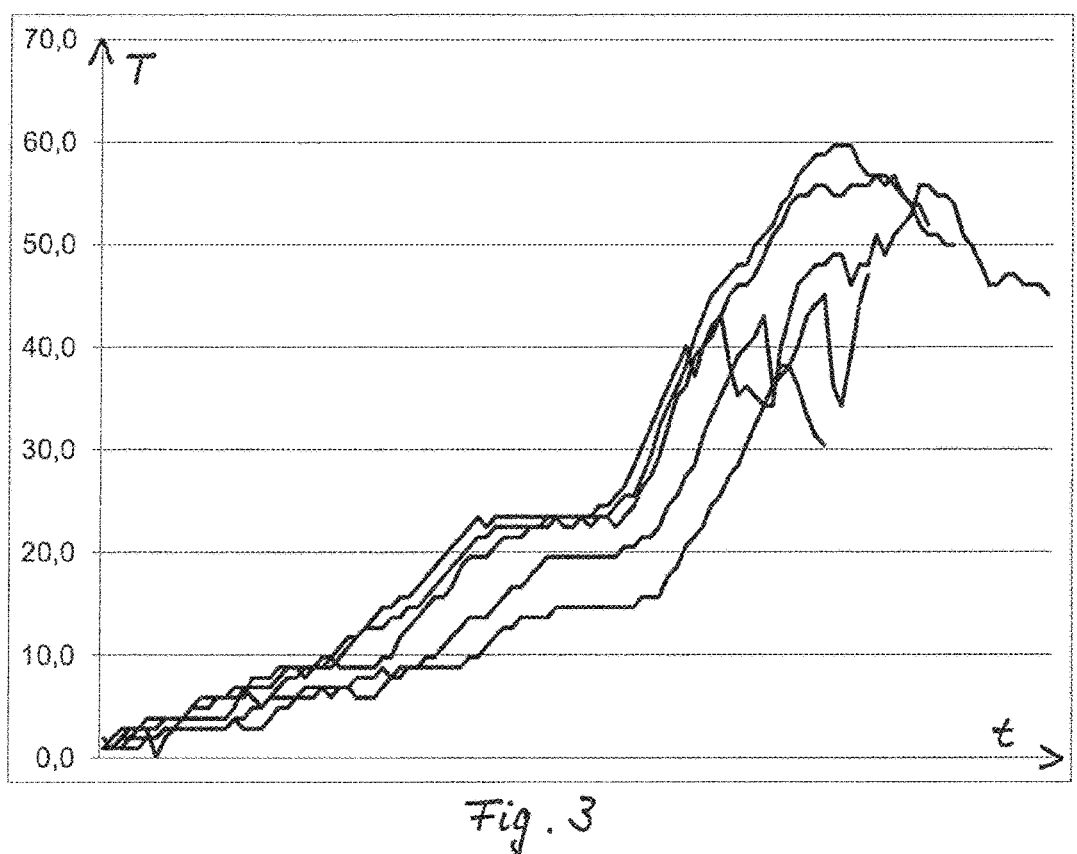

Further details and features arise from the following description of an embodiment and on basis of the drawings. Therein shows:

FIG. 1 an enlarged view of an embodiment of a dental implant according to the invention, FIG. 2 a sectional view of the dental implant according to FIG. 1 along line A-A in FIG. 1, FIG. 3 a torque diagram of a conventional frustoconical dental implant, and FIG. 4 a torque diagram of the dental implant according to the invention during implant insertion.

A synopsis of FIGS. 1 and 2 shows the structure of an exemplary dental implant 1 according to the invention, which comprises a core 10 and an external thread 3 surrounding the core. The dental implant has a tip area 2 which is provided with a sharp-edged external thread 3 and which may be at least slightly conical.

The tip area 2 is adjoined by a middle area 4, which is provided with a trapezoid-like external thread 3, which is more blunt than the external thread 3 of the tip area 2.

The middle area 4 is in turn adjoined by a coronal area 6, which in turn is provided with a sharp-edged external thread 3, which is thus sharper-edged than the external thread 3 in the middle area 4 and is preferably just as sharp-edged as the external thread 3 in the tip area 2.

The synopsis of FIGS. 1 and 2 illustrates that a longitudinal axis L extends through the dental implant through the tip area 2, the middle area 4 and the coronal area 6.

In addition, the sectional view of FIG. 2 illustrates that the tip area 2, the middle area 4, the coronal area 6 and an end area 8 adjoining the latter, which has an internal thread 9, form a single-piece component.

Furthermore, the sectional view of FIG. 2 shows that the middle area 4 is provided with an outward bulge A. This bulge A is illustrated in FIG. 2 by the lines L1 and L2 connecting the base areas of the external thread 3, wherein the outward direction results from the representation of the double arrow R starting from the longitudinal axis L and whose arrowheads point outward to the lines L1 and L2. In other words, this means that the bulge A results from the lines L1 and L2 being curved outward relative to a core diameter KD of the dental implant 1 in direction of an outer diameter AD of the dental implant 1.

Accordingly, the tip area 2 and the coronal area 6 are tapered compared to the bulged middle area 4, which means that these areas 2 and 6 are less massive.

A comparison of the diagrams according to FIG. 3 and according to FIG. 4 makes it clear that the courses of torque during screwing in a dental implant 1 according to the invention shown in FIG. 4 show a maximal torque range when the middle area 4 passes the cortical bone, which leads to the particular advantages of the dental implant 1 according to the invention explained at the beginning. In contrast, the courses of torque during screwing in a conventional frustoconical dental implant shown in FIG. 3 show a maximal torque range in the final phase of screwing in, when the maximal extension of the frustum is screwed into the cortical bone, thereby compressing it strongly. This is associated with the disadvantages mentioned above.

LIST OF REFERENCE SIGNS

1 Dental implant
2 Tip area
3 External thread
4 Middle area
6 Coronal area
8 End area
9 Internal thread
10 Core
11 Apical end
12 Cervical end
A Bulge
L Longitudinal axis
L1, L2 Lines for illustration of the bulge A
R Double arrow starting from the longitudinal axis L
AD Outer diameter
KD Core diameter

The invention claimed is:

1. Dental implant (1) for anchoring of a dental prosthesis, wherein the dental implant (1) comprises a core (10) and an external thread (3) surrounding the core (10), wherein the dental implant (1) has an apical end (11) and a cervical end (12) to be screwed by the external thread (3) with the apical end (11) first into a recess formed in a jaw bone and to anchor the dental prosthesis at the cervical end (12), wherein the dental implant (1) material comprises a metal or a metal alloy, wherein the dental implant (1) comprises in the order from the apical end (11) to the cervical end (12)

a tip area (2) in which the external thread (3) is sharp-edged, a middle area (4) adjoining the tip area (2), in which the external thread (3) is trapezoid-like and a coronal area (6) adjoining the middle area (4), in which the external thread (3) is sharp-edged and sharper-edged than the external thread (3) in the middle area (4), wherein a longitudinal axis (L) extends through the tip area (2), the middle area (4) and the coronal area (6), wherein the core (10) has a bulge (A) in the middle area (4) in any cross-section passing through the entire length of the longitudinal axis (L), while the tip area (2) and the coronal area (6) are not bulged and the external thread (3) has a nominal diameter which is constant in the entire middle area or increases in the entire middle area in a direction from the apical end (11) to the cervical end (12), whereby the external thread (3) is not bulged in the middle area (4) in any cross-section passing through the entire length of the longitudinal axis (L), wherein a thread depth of the external thread (3) is smaller at every position in an area of the bulge (A) than at every position in the tip area (2) and at every position in the coronal area (6), wherein the greater the bulge (A) of the core (10) the smaller the thread depth, wherein the thread depth in the tip area (2) and in the coronal area (6) is greater than in the middle area (4).

2. Dental implant (1) according to claim 1, wherein the metal is titanium and the metal alloy comprises titanium.

3. Dental implant (1) according to claim 1, wherein an end area (8) adjoins the coronal area (6).

4. Dental implant (1) according to claim 3, wherein the end area (8) has an external or internal connection and an internal thread (9).

5. Dental implant (1) according to claim 1, wherein the external thread (3) and the core (10) are formed in one piece.

6. Dental implant (1) according to claim 1, wherein the nominal diameter of the external thread (3) increases in a direction from the apical end (11) to the cervical end (12) in an entire area comprising the tip area (2), the middle area (4) and the coronal area (6).

7. Dental implant (1) according to claim 1, wherein the nominal diameter of the external thread (3) is equal in a direction from the apical end (11) to the cervical end (12) in an entire area comprising the tip area (2), the middle area (4) and the coronal area (6).

8. Dental implant (1) according to claim 1, wherein the entire external thread (3) in the tip area (2) is sharper-edged than the external thread (3) in the middle area (4).

9. Method of manufacturing of the dental implant (1) according to claim 1 by turning a turned part from a material which comprises a metal or a metal alloy, wherein the external thread (3) is cut into the turned part by a cutting tool, wherein the bulge (A) in the middle area (4) is created by changing of a distance of a cutting area of the cutting tool from a rotation axis coinciding with the longitudinal axis (L).

* * * * *